(12) United States Patent
Seifert

(10) Patent No.: US 10,814,682 B2
(45) Date of Patent: Oct. 27, 2020

(54) SYSTEM FOR MONITORING TIRE PRESSURE AND METHOD FOR MOUNTING A TIRE PRESSURE MONITORING SYSTEM ON A RIM

(71) Applicant: Huf Hülsbeck & Fürst Gmbh & Co. KG, Velbert (DE)

(72) Inventor: Andre Seifert, Pforzheim (DE)

(73) Assignee: HUF BAOLONG ELECTRONICS BRETTEN GMBH, Bretten (DE)

( * ) Notice: Subject to any disclaimer, the term of this patent is extended or adjusted under 35 U.S.C. 154(b) by 162 days.

(21) Appl. No.: 16/162,685

(22) Filed: Oct. 17, 2018

(65) Prior Publication Data

US 2019/0047337 A1    Feb. 14, 2019

Related U.S. Application Data

(63) Continuation of application No. PCT/EP2017/063832, filed on Jun. 7, 2017.

(30) Foreign Application Priority Data

Jun. 13, 2016    (DE) .................. 10 2016 110 805

(51) Int. Cl.
   *B60C 23/04*    (2006.01)
   *B60C 29/02*    (2006.01)

(52) U.S. Cl.
   CPC ...... *B60C 23/0494* (2013.01); *B60C 23/0447* (2013.01); *B60C 23/0498* (2013.01); *B60C 29/02* (2013.01)

(58) Field of Classification Search
   USPC ................................. 73/146–146.8
   See application file for complete search history.

(56) References Cited

U.S. PATENT DOCUMENTS

| | | | |
|---|---|---|---|
| 6,722,409 B1 * | 4/2004 | Martin | B60C 23/0408 152/415 |
| 9,656,523 B2 | 5/2017 | Gorenzweig et al. | |
| 2002/0046599 A1 * | 4/2002 | Chuang | B60C 23/0408 73/146 |
| 2004/0119584 A1 * | 6/2004 | Kayukawa | B60C 23/0494 340/445 |
| 2005/0087228 A1 * | 4/2005 | Uleski | B60C 23/0494 137/223 |

(Continued)

FOREIGN PATENT DOCUMENTS

DE         201 10 759 U1    2/2002
DE   10 2014 113 573 A1    3/2016

(Continued)

*Primary Examiner* — Andre J Allen
(74) *Attorney, Agent, or Firm* — Hackler Daghighian Martino & Novak

(57) ABSTRACT

A tire pressure monitoring system with a tire valve and a tire pressure monitoring unit includes a plastic housing, in which a pressure sensor for measuring the tire pressure and a transmitter for wirelessly transmitting tire pressure data are arranged. The tire pressure monitoring unit is attached to a stem of the tire valve and the stem comprises latching recesses, into which a latching element of the tire pressure monitoring unit engages. The latching element is realized integrally with a wall of the housing. A method for installing a tire pressure monitoring system on a rim is furthermore proposed.

13 Claims, 1 Drawing Sheet

(56) References Cited

U.S. PATENT DOCUMENTS

| | | | |
|---|---|---|---|
| 2005/0087229 A1* | 4/2005 | Uleski | B60C 23/0408 |
| | | | 137/223 |
| 2009/0064775 A1 | 3/2009 | Hui | |
| 2015/0136244 A1 | 5/2015 | Kempf | |
| 2016/0082792 A1 | 3/2016 | Gorenzweig et al. | |
| 2018/0038500 A1* | 2/2018 | Mori | F16K 15/20 |
| 2018/0080572 A1* | 3/2018 | Smith, Jr. | B60C 25/18 |
| 2019/0118590 A1* | 4/2019 | Gonzales, Jr. | B60C 23/0494 |
| 2019/0217672 A1* | 7/2019 | Li | B60C 23/04 |

FOREIGN PATENT DOCUMENTS

| | | | |
|---|---|---|---|
| DE | 20 2016 101336 U1 | 5/2016 | |
| FR | 2872086 A1 | 12/2005 | |
| JP | 5 933422 B2 | 6/2014 | |

\* cited by examiner

SYSTEM FOR MONITORING TIRE PRESSURE AND METHOD FOR MOUNTING A TIRE PRESSURE MONITORING SYSTEM ON A RIM

CROSS-REFERENCE TO RELATED APPLICATIONS

This continuation application claims priority to PCT/EP2017/063832 filed on Jun. 7, 2017 which has published as WO 2017/216008 A1 and also the German application number 10 2016 110 805.7 filed on Jun. 13, 2016, the entire contents of which are fully incorporated herein with these references.

DESCRIPTION

Field of the Invention

The invention relates to a tire pressure monitoring system.

Background of the Invention

The invention is based on a tire pressure monitoring system with the characteristics cited in the preamble of claim 1 as known from US 2015/0136244 A1.

Such a system comprises a tire pressure monitoring unit, which contains a pressure sensor for measuring the tire pressure and a transmitter for transmitting pressure data, and a tire valve, on which the tire pressure monitoring unit is mounted.

The mounting of the tire pressure monitoring unit on the valve is subject to a number of requirements. The mounting must on the one hand have a certain mechanical load capacity in order to withstand the accelerations occurring while driving at high speeds, e.g. at 250 km/h, and should on the other hand be manufacturable as inexpensively as possible and allow a simple installation of the tire pressure monitoring unit on the tire valve. On so-called snap-in valves, the valve stem of which is surrounded by a rubber seal, the rubber seal is furthermore subjected to tilting moments, which press the seal against the edge of the rim bore and are caused by the mass of the tire pressure monitoring unit mounted on the valve, as well as the mass of the valve itself. These tilting moments must be kept so low that they do not damage the rubber seal even at high speeds.

Tilting moments of a tire pressure monitoring system can be reduced by reducing the mass of the tire pressure monitoring unit. Alternatively, the center of mass of the system consisting of the valve and the tire pressure monitoring unit in the tire interior can be respectively shifted as close as possible or even into the valve through-bore of the rim or out of the tire. This can be achieved by moving the center of gravity of the tire pressure monitoring unit closer to the rim or by increasing the mass of the valve outside the tire, e.g. with a ring, a thickening or another balancing weight.

SUMMARY OF THE INVENTION

An object of the present invention is to provide a way for mounting a tire pressure monitoring unit on a tire valve with little installation effort in such a way that only low tilting moments occur while driving.

This object is attained by means of a tire pressure monitoring system with the characteristics disclosed in claim 1, a tire pressure monitoring unit according to claim 10 and a method for installing a tire pressure monitoring system on a rim according to claim 11. Advantageous refinements of the invention are the matter of dependent claims.

A tire pressure monitoring unit of the present invention is attached to a stem of a tire valve, which comprises multiple latching recesses that are arranged behind one another and into which a latching element engages. The latching element is realized (formed, shaped, fashioned, designed, made, produced) integrally with a wall of the housing of the tire pressure monitoring device and therefore also consists of plastic just as the housing of the tire pressure monitoring unit. Since a housing is required anyway, a latching element can thereby be manufactured without significant additional costs, for example by manufacturing the housing wall and the latching element as one piece in an injection molding process. The tire pressure monitoring unit can be very easily mounted on a valve, namely by attaching the tire pressure monitoring unit to the valve stem such that the latching element engages into one of the latching recesses. This can be done even without a tool such that the installation on a tire is very simple.

Since a row of latching recesses is arranged on the stem of the valve, the tire pressure monitoring unit can be used on different rim geometries and nevertheless always mounted very close to the valve through-bore such that only relatively low tilting moments can occur while driving. To this end, the tire pressure monitoring unit is displaced on the valve stem as far as possible toward the valve through-bore until an end position is reached. The distance of this end position from the valve through-bore of the rim depends on how many latching recesses the stem comprises, as well as their spacing from one another.

The tire pressure monitoring unit has an opening, into which the valve stem is inserted. This opening is preferably a through-channel. In this way, air being pumped into the tire through the valve can reach the interior of the tire through the valve stem and the opening of the tire pressure monitoring unit with relatively little flow resistance.

According to an advantageous refinement of the invention, it is proposed that the latching element forms part of a lever arm. One end of the lever arm is fixed on the housing of the tire pressure monitoring unit whereas the other end is free. The latching element can be disengaged from the respective latching recess by lifting the free end of the lever arm such that the tire pressure monitoring unit can be once again removed from the stem. This can be advantageously done without the use of a tool.

The latching element on the lever arm may be realized in the form of a projection, e.g. a lug or a hook. In this context, the latching element is preferably arranged at a certain distance from the free end of the lever arm. This has the advantage that the latching element does not interfere with grabbing and lifting the lever arm.

According to another advantageous refinement of the invention, it is proposed that the lever arm extends along the valve stem. For example, the lever arm may extend over the valve stem parallel thereto. However, the lever arm may also be oriented transverse to the valve stem. In this case, in particular, the lever arm does not have to comprise a projection in order to engage into one of the latching recesses of the valve stem.

According to another advantageous refinement of the invention, it is proposed that the latching recesses are notches. In this case, the notches and the latching element may form a locking device, e.g. similar to a cable tie. The engagement of the latching element into one of the latching recesses then prevents the removal of the tire pressure monitoring unit from the valve stem, but allows a displacement in the opposite direction, i.e. a displacement of the tire pressure monitoring unit toward the valve bore of a rim.

The number of latching recesses on the valve stem can largely be chosen freely. As a matter of principle, the tire pressure monitoring unit can regardless of the given rim geometry be displaced the closer to the valve bore of the rim, the more latching recesses the valve stem comprises. Due to lack of space, the number of latching recesses can starting at a certain limit only be additionally increased by reducing their size. However, excessively small latching recesses reduce the mechanical load capacity of the latching connection.

It is generally advantageous if the valve stem comprises at least 5 latching recesses, preferably at least 7 latching recesses. An increase of the number of latching recesses to more than 12 typically does not provide any additional advantage.

BRIEF DESCRIPTION OF THE DRAWINGS

Other details and advantages of an illustrative embodiment of the invention are described in greater detail below with reference to the attached drawings. In these drawings.

DETAILED DESCRIPTION OF THE PREFERRED EMBODIMENTS

Figure 1:
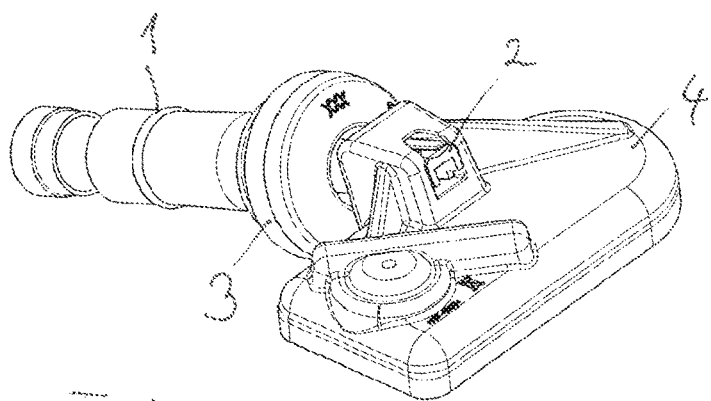
FIG. 1 shows a tire valve with an attached tire pressure monitoring unit.
Figure 2:
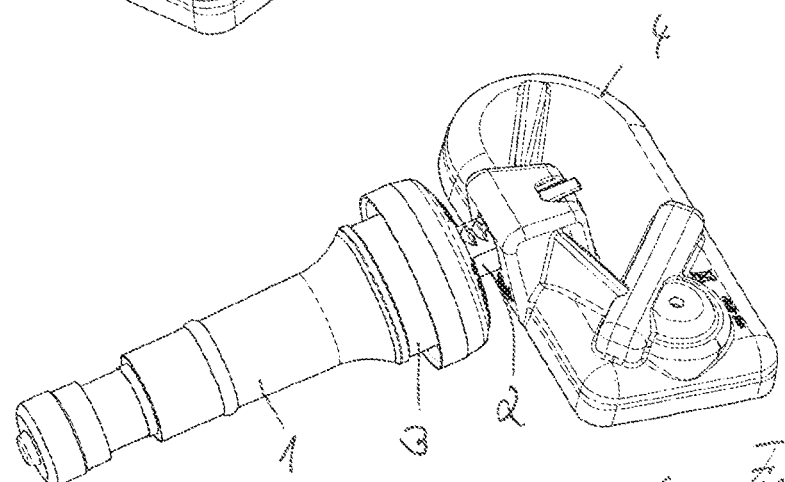
FIG. 2 shows another view of the tire valve with the tire pressure monitoring unit.
Figure 3:
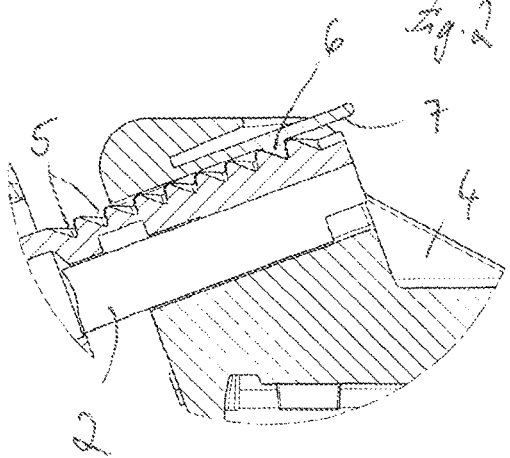
FIG. 3 shows a sectioned detail of the tire valve and the tire pressure monitoring unit in the engaged state.
Figure 4:
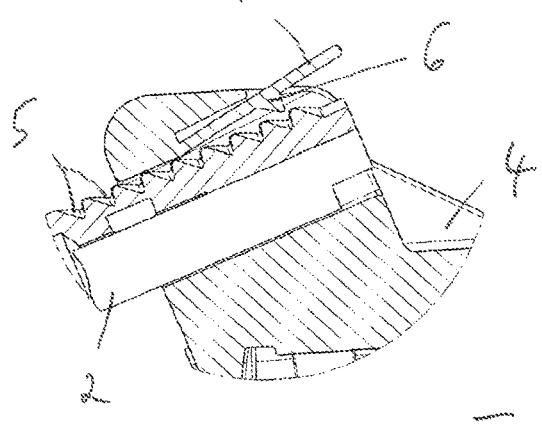
FIG. 4 shows a sectioned detail of the tire valve and the tire pressure monitoring unit in the disengaged state.

FIGS. 1 and 2 show different views of a tire pressure monitoring system. A first component of this system is a tire valve 1, e.g. a so-called snap-in valve, with a valve stem 2 that is surrounded by a rubber seal 3. A second component of the tire pressure monitoring system is a tire pressure monitoring unit 4 that comprises a plastic housing, in which a pressure sensor for measuring the tire pressure and a transmitter for wirelessly transmitting tire pressure data are arranged. The housing is made of plastic and has an opening, into which the valve stem 2 of the tire valve 1 is inserted. FIGS. 3 and 4 respectively show an end section of the valve stem 2 and the opening of the housing, into which the valve stem 2 is inserted, in the form of sectioned details.

According to FIGS. 3 and 4, in particular, the valve stem 2 comprises a row of latching recesses 5 that are arranged behind one another and into which a latching element 6 of the tire pressure monitoring unit 4 engages. The latching element 6 is realized integrally with a wall of the housing of the tire pressure monitoring unit 4. The latching element 6 is therefore also made of plastic just as the housing of the tire pressure monitoring unit 4. In this way, the latching element 6 can be inexpensively manufactured integrally with the housing, namely during the injection molding process of the housing of the tire pressure monitoring unit 4.

The latching element 6 may form part of a plastic lever arm 7 that is fixed on a wall of the housing of the tire pressure monitoring unit 4 with one end and freely movable on its opposite end. The latching element 6 therefore can be disengaged from one of the latching recesses 5 of the valve stem 2 by lifting the free end such that the tire pressure monitoring unit 4 can be once again removed from the valve stem 2.

The lever arm 7 extends parallel to the valve stem 2. In the illustrative embodiment shown, the latching recesses 5 are arranged on an upper side of the valve stem 2, which in the installed state faces away from the rim well of a wheel. For example, the latching recesses 5 may also be arranged laterally on the valve stem 2. Furthermore, multiple latching elements 6 may also be arranged on the lever arm 7, for example, in order to realize a certain mechanical load capacity of the connection. However, a single latching element 6 is sufficient.

The latching recesses 5 are preferably realized in the form of notches. In this context, it is particularly advantageous if the notches have on a first side a steeper rise than on an opposite side. In other words, the notches are defined by a first face on a first side and by a second face on their opposite side, wherein the first face has a steeper rise than the second face. In this way, the tire pressure monitoring unit 4 can be pushed further on the stem 2 by means of the second face while the steeper first face prevents an undesirable separation of the tire pressure monitoring unit 4 from the valve stem 2. The steeper first face may be oriented perpendicular to the longitudinal direction of the valve stem 2 or include an angle of more less than 90° with the longitudinal direction of the valve stem 2.

In the embodiment shown, the latching element 6 engages with the notches in such a way that it disengages from the respective notch when the tire pressure monitoring unit 4 is pushed further on the stem 2 and prevents a displacement in the opposite direction.

In order to install the illustrated tire pressure monitoring system on a rim, the tire valve 1 is inserted into the valve bore of the rim. In this case, the tire pressure monitoring unit 4 may already be attached to the valve stem 2. The tire pressure monitoring system may be delivered in the state according to FIG. 3, in which the latching element 6 of the tire pressure monitoring unit 4 engages into one of the latching recesses 5 of the valve stem, particularly the last latching recess 5, i.e. the latching recess 5 located closest to the inner end of the stem 2.

After the attachment of the tire pressure monitoring unit 4 to the valve stem 2, the tire pressure monitoring unit 4 is displaced as close as possible to the valve bore of the rim. In its end position, the tire pressure monitoring unit 4 is then located very close to the rim and the center of gravity of the tire pressure monitoring system is therefore also located very close to the rim or even within the valve bore. The size of a potential gap between the rim and the tire pressure monitoring unit 4 in its end position is defined by the spacing between a latching recess 5 and an adjacent latching recess 5. The smaller this spacing, the better the end position of the tire pressure monitoring unit 4 can be adapted to a given rim geometry. For example, five or more latching recesses 5 may be arranged on the valve stem 2. It is advantageous to provide seven or more latching recesses 5. An increase of the number of latching recesses to more than fifteen generally does not provide any additional advantage.

The valve stem 2 may be open on a longitudinal side, for example on its underside. The valve stem 2 is approximately U-shaped in the exemplary embodiment shown. Air can escape from the valve through the open longitudinal side of the valve stem when the corresponding tire is inflated. The valve stem 2 is furthermore open on its end. When the tire is inflated, air can therefore flow into the interior of the tire through the valve stem 2 and the opening of the tire pressure monitoring unit 4.

The valve stem 2 of the tire valve may be realized in one piece. However, it is also possible to use a valve stem 2 that is composed of two parts. In this case, a first section of the valve stem, which is surrounded by the rubber seal 3, may be made of a first material, e.g. of brass or bronze, whereas a second section of the valve stem 2, which protrudes from the rubber seal and carries the latching recesses 5, may be made of a second material, e.g. of special steel. The two sections of the valve stem, namely a section that is surrounded by the rubber seal 5 on the one hand and a section that comprises the latching recesses 5 on the other hand, are subject to very different requirements such that it may be advantageous if the valve stem is composed of two parts. However, this is associated with an increased manufacturing effort such that a one-piece design is less expensive in many instances.

LIST OF REFERENCE SYMBOLS

1 Tire valve
2 Valve stem
3 Rubber seal
4 Tire pressure monitoring unit
5 Latching recesses
6 Latching element
7 Lever arm

What is claimed is:

1. A tire pressure monitoring system, comprising:
   a tire valve; and
   a tire pressure monitoring unit that comprises a plastic housing, in which a pressure sensor for measuring the tire pressure and a transmitter for wirelessly transmitting tire pressure data are arranged;
   wherein the tire pressure monitoring unit is attached to a stem of the tire valve; and
   wherein the stem comprises a row of latching recesses that are arranged behind one another, into which a latching element of the tire pressure monitoring unit engages at least one latching recess of the row of latching recesses;
   wherein the latching element is realized integrally with a wall of the housing.

2. The system according to claim 1, wherein the latching element forms part of a lever arm.

3. The system according to claim 2, wherein the lever arm extends along the stem.

4. The system according to claim 1, wherein the row of latching recesses are arranged on an upper side of the stem, which in the installed state faces away from the rim well.

5. The system according to claim 1, wherein the row of latching recesses are a row of notches.

6. The system according to claim 5, wherein the notches are defined by a first face on a first side and by a second face on the opposite side, wherein the first face has a steeper rise than the second face such that the tire pressure monitoring unit can be pushed further on the stem by engaging the second face, but an undesirable separation of the tire pressure monitoring unit from the stem is prevented by engaging the first face.

7. The system according to claim 5, wherein the latching element engages with the notches in such a way that it disengages from the respective notch when the tire pressure monitoring unit is pushed further on the stem and prevents a displacement in the opposite direction.

8. The system according to claim 6, wherein the latching element engages with the notches in such a way that it disengages from the respective notch when the tire pressure monitoring unit is pushed further on the stem and prevents a displacement in the opposite direction.

9. The system according to claim 1, wherein the stem comprises at least five latching recesses which are arranged in the row.

10. The system according to claim 1, wherein the stem comprises at least seven latching recesses which are arranged in the row.

11. The system according to claim 1, wherein the stem comprises an opening, which extends in its longitudinal direction and allows the escape of air being pumped into the tire through the valve.

12. A tire pressure monitoring unit, comprising:
    a plastic housing, wherein a pressure sensor for measuring the tire pressure and a transmitter for wirelessly transmitting tire pressure data are arranged;
    an opening for being attached to a stem of a tire valve that comprises multiple latching recesses; and
    a latching element for engaging into the latching recesses;
    wherein the latching element is formed integrally with a wall of the housing and wherein the latching element forms part of a lever arm.

13. A method for installing a tire pressure monitoring system on a rim, in which a snap-in tire valve is inserted into a rim bore and a tire pressure monitoring unit is subsequently displaced toward the rim bore linearly along a stem of the tire valve, wherein a latching element of the tire pressure monitoring unit successively engages into a row of latching recesses of the stem.

* * * * *